(12) United States Patent
Parent et al.

(10) Patent No.: US 7,238,736 B2
(45) Date of Patent: Jul. 3, 2007

(54) PROCESS TO PRODUCE SILICA-FILLED ELASTOMERIC COMPOUNDS

(75) Inventors: John Scott Parent, Kingston (CA); Ralph Allen Whitney, Kingston (CA); Andrea Liskova, Kingston (CA); Rui Resendes, Samia (CA)

(73) Assignees: LANXESS Inc., Sarnia, Ontario (CA); Queens University at Kingston, Kingston, Ontario (CA)

( * ) Notice: Subject to any disclaimer, the term of this patent is extended or adjusted under 35 U.S.C. 154(b) by 320 days.

(21) Appl. No.: 10/834,437

(22) Filed: Apr. 29, 2004

(65) Prior Publication Data

US 2005/0245649 A1 Nov. 3, 2005

(30) Foreign Application Priority Data

Apr. 28, 2004 (CA) .................................. 2465301

(51) Int. Cl.
*C08K 5/50* (2006.01)
*C08K 3/32* (2006.01)

(52) U.S. Cl. ................. 524/154; 524/7; 524/430; 524/445; 524/451

(58) Field of Classification Search ........... 524/154, 524/7, 430, 445, 451
See application file for complete search history.

(56) References Cited

U.S. PATENT DOCUMENTS 6,441,070 B1 * 8/2002 Halasa et al. ............. 524/128
6,825,281 B2 * 11/2004 Tse et al. ................. 525/241
6,956,075 B2 * 10/2005 Wang et al. ............... 524/251
7,019,058 B2 * 3/2006 Wang et al. ............... 524/154
2006/0058430 A1 * 3/2006 Dyllick-Brenzinger et al. .................... 524/115
2006/0167146 A1 * 7/2006 Rotzinger et al. ......... 524/128

FOREIGN PATENT DOCUMENTS

| CA | 2293149 | 6/2001 |
|---|---|---|
| CA | 2 339 060 | 9/2002 |
| CA | 2 368 363 | 7/2003 |
| CA | 2418822 | 8/2004 |
| EP | 1 172 405 | 1/2002 |
| EP | 1 233 038 | 8/2002 |
| EP | 1 408 074 | 4/2004 |
| GB | 2 276 387 | 9/1994 |
| WO | 02/31049 | 4/2002 |

OTHER PUBLICATIONS

Database WPI, Section Ch, Week 198509, Derwent Publications, Ltd., London, GB; Class A12, AN 1985-052375 XP002338792 & JP 60 008315 A (Toshiba KK), (Jan. 17, 1985) *abstract*.

* cited by examiner

*Primary Examiner*—Peter Szekely
(74) *Attorney, Agent, or Firm*—Jennifer R. Seng

(57) ABSTRACT

The present invention provides a process for preparing a filled halobutyl elastomer, which includes mixing a halobutyl elastomer with at least one mineral filler and at least one phosphine modifier and optionally curing the filled elastomer with sulfur or other curative systems. Filled halobutyl elastomers prepared according to the present invention possess improved levels of filler dispersion which results in a reduction in the hardness of the compound and an increased tensile strength.

15 Claims, 1 Drawing Sheet

PROCESS TO PRODUCE SILICA-FILLED ELASTOMERIC COMPOUNDS

FIELD OF THE INVENTION

The present invention relates to a process to prepare silica-filled halogenated butyl elastomers, such as bromobutyl elastomers (BIIR).

BACKGROUND OF THE INVENTION

It is known that reinforcing fillers such as carbon black and silica greatly improve the strength and fatigue properties of elastomeric compounds. It is also known that chemical interactions occur between the elastomer and the filler. Good interaction between carbon black and highly unsaturated elastomers such as polybutadiene (BR) and styrene butadiene copolymers (SBR) occurs due to the large number of carbon-carbon double bonds present in the copolymers. Butyl elastomers may have only one tenth, or fewer, of the carbon-carbon double bonds found in BR or SBR, and compounds made from butyl elastomers are known to interact poorly with carbon black. For example, a compound prepared by mixing carbon black with a combination of BR and butyl elastomers results in domains of BR, which contain most of the carbon black, and butyl domains which contain very little carbon black. It is also known that butyl compounds have poor abrasion resistance.

Canadian Patent Application 2,293,149 teaches that it is possible to produce filled butyl elastomer compositions with improved physical properties by combining halobutyl elastomers with silica and specific silanes. These silanes act as dispersing and bonding agents between the halogenated butyl elastomer and the filler. However, one disadvantage of the use of silanes is the evolution of alcohol during the manufacturing process and potentially during the use of the manufactured article produced by this process. Additionally, silanes significantly increase the cost of the resulting manufactured article.

Co-pending Canadian Patent Application 2,418,822 teaches a process for preparing compositions containing halobutyl elastomers and at least one mineral filler that has been reacted with at least one organic compound containing at least one basic nitrogen-containing group and at least one hydroxyl group and optionally at least one silazane compound before admixing the (pre-reacted) filler with the halobutyl elastomer. According to CA 2,418,822 the elastomers have improved properties, such as tensile strength and abrasion resistance due to the pre-functionalization of the silica with DMAE and/or HMDZ.

Co-pending Canadian Application CA 2,368,363 discloses filled halobutyl elastomer compositions containing halobutyl elastomers, at least one mineral filler in the presence of organic compounds containing at least one basic nitrogen-containing group and at least one hydroxyl group and at least one silazane compound.

Co-pending Canadian Patent Application 2,339,080 discloses filled halobutyl elastomeric compounds containing certain organic compounds containing at least one basic nitrogen-containing group and at least one hydroxyl group enhance the interaction of halobutyl elastomers with carbon-black and mineral fillers, resulting in improved compound properties such as tensile strength and abrasion (DIN).

Filled halobutyl elastomeric compounds according to the present invention utilize phosphines as a novel class of modifiers. The phosphonium modified butyl according to the present invention is ionomeric and therefore possess enhanced affinity towards polar, hydrophilic fillers such as silica. Unlike the amine modifiers known in the cited art, the phosphine modifiers according to the present invention, are involatile and therefore safer to use.

SUMMARY OF THE INVENTION

The present invention provides a process for preparing compositions containing halobutyl elastomers and at least one mineral filler which have been prepared in the presence of at least one phosphine based modifier.

Surprisingly, it has been discovered that phosphines based compounds enhance the interaction of halobutyl elastomers with mineral fillers, resulting in improved compound properties such as tensile strength and abrasion (DIN) resistance. Treatment of BIIR with phosphine based modifiers, for example $PPh_3$, wherein Ph is an aromatic $C_6H_5$ substituent, is believed to result in thermally stable, polymer-bound $IIR-[PPh_3]^+Br^-$ sites which interact favorably with the polar surfaces of mineral fillers such as silica and/or neat or organophilically modified clays.

Accordingly, the present invention also provides a process, which includes mixing a halobutyl elastomer with at least one mineral filler, and at least one phosphine based modifier, and then curing the resulting filled halobutyl elastomer. According to the present invention, the resulting filled halobutyl elastomer has improved properties.

BRIEF DESCRIPTION OF THE DRAWINGS

The FIGURE illustrates the stress strain profile of a silica containing compound prepared with $PPh_3$ and a compound prepared in the absence of $PPh_3$.

DETAILED DESCRIPTION OF THE INVENTION

Figure 1:
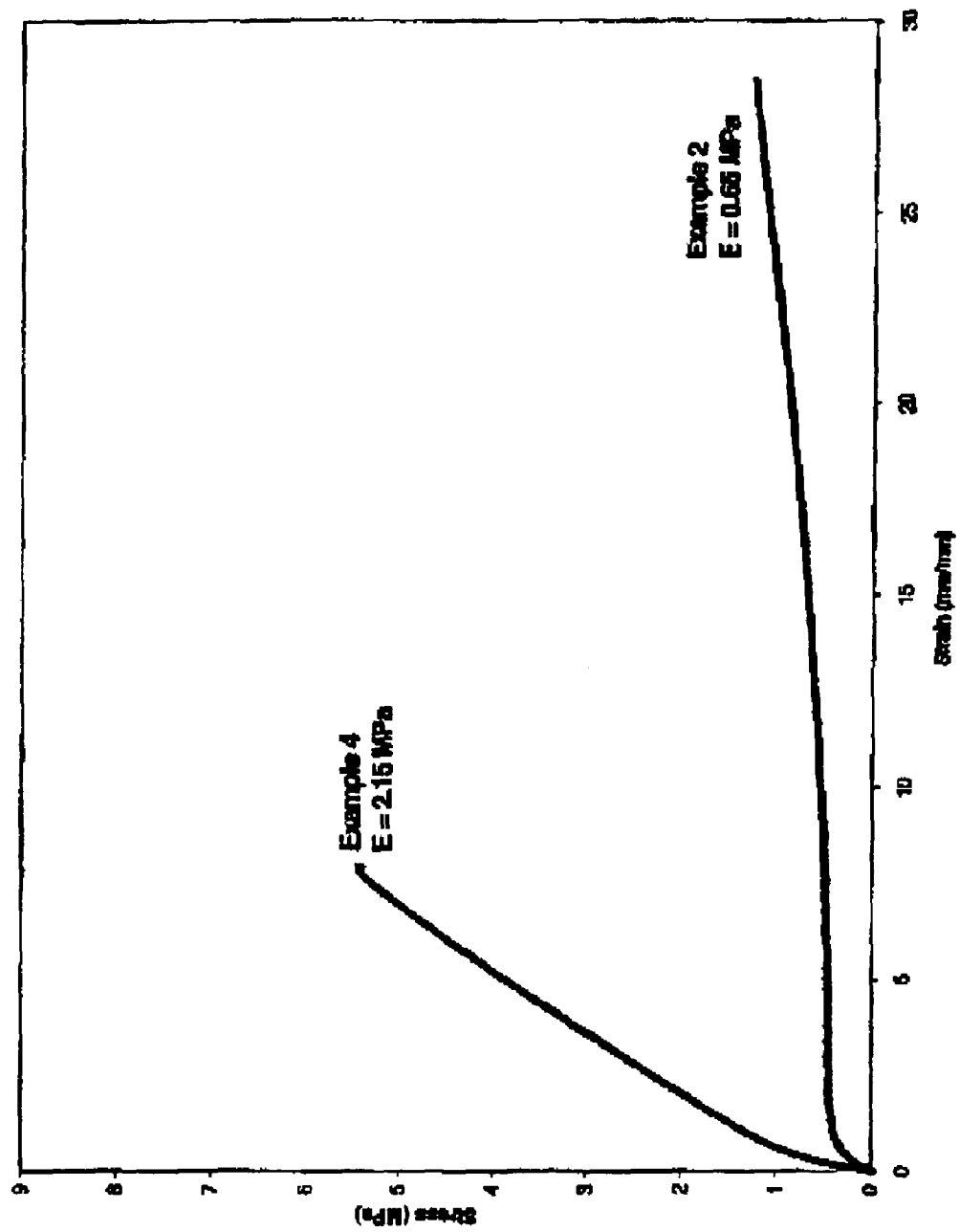

The phrase "halobutyl elastomer(s)" as used herein refers to a chlorinated and/or brominated butyl elastomer. Brominated butyl elastomers are preferred, and the present invention is illustrated, by way of example, with reference to such bromobutyl elastomers. It should be understood, however, that the present invention includes use of chlorinated butyl elastomers.

Brominated butyl elastomers may be obtained by bromination of butyl rubber (which is a copolymer of an isoolefin, usually isobutylene and a co-monomer that is usually a $C_4$ to $C_6$ conjugated diolefin, preferably isoprene—(brominated isobutene-isoprene-copolymers BIIR)). Co-monomers other than conjugated diolefins can be used, for example, alkyl-substituted vinyl aromatic co-monomers such as $C_1$-$C_4$-alkyl substituted styrene(s). An example of such an elastomer which is commercially available is brominated isobutylene methylstyrene copolymer (BIMS), in which the co-monomer is p-methylstyrene.

Brominated butyl elastomers typically contain in the range of from 0.1 to 10 weight percent of repeating units derived from diolefin (preferably isoprene) and in the range of from 90 to 99.9 weight percent of repeating units derived from isoolefin (preferably isobutylene) (based upon the hydrocarbon content of the polymer) and in the range of from 0.1 to 9 weight percent bromine (based upon the bromobutyl polymer). A typical bromobutyl polymer has a molecular weight, expressed as the Mooney viscosity according to DIN 53 523 (ML 1+8 at 125° C.), in the range of from 25 to 60.

According to the present invention, the brominated butyl elastomer preferably contains in the range of from 0.5 to 5 weight percent of repeating units derived from isoprene (based upon the hydrocarbon content of the polymer) and in the range of from 95 to 99.5 weight percent of repeating units derived from isobutylene (based upon the hydrocarbon content of the polymer) and in the range of from 0.2 to 3 weight percent, preferably from 0.75 to 2.3 weight percent, of bromine (based upon the brominated butyl polymer).

A stabilizer may be added to the brominated butyl elastomer. Suitable stabilizers include calcium stearate and hindered phenols, preferably used in an amount in the range of from 0.5 to 5 parts per 100 parts by weight of the brominated butyl rubber (phr).

Examples of suitable brominated butyl elastomers include Bayer Bromobutyl® 2030, Bayer Bromobutyl® 2040 (BB2040), and Bayer Bromobutyl® X2 commercially available from Bayer. Bayer BB2040 has a Mooney viscosity (ML 1+8 @ 125° C.) of 39±4, a bromine content of 2.0±0.3 wt % and an approximate weight average molecular weight of 500,000 grams per mole.

The brominated butyl elastomer used in the process of the present invention may also be a graft copolymer of a brominated butyl rubber and a polymer based upon a conjugated diolefin monomer. Co-pending Canadian Patent Application 2,279,085 is directed towards a process for preparing graft copolymers by mixing solid brominated butyl rubber with a solid polymer based on a conjugated diolefin monomer which also includes some C—S—(S)$_n$—C bonds, where n is an integer from 1 to 7, the mixing being carried out at a temperature greater than 50° C. and for a time sufficient to cause grafting. The disclosure of this application is incorporated herein by reference with regard to jurisdictions allowing for this procedure.

The bromobutyl elastomer of the graft copolymer can be any of those described above. The conjugated diolefins that can be incorporated in the graft copolymer generally have the structural formula:

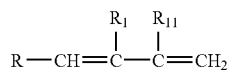

wherein R is a hydrogen atom or an alkyl group containing from 1 to 8 carbon atoms and wherein $R_1$ and $R_{11}$ can be the same or different and are selected from hydrogen atoms and alkyl groups containing from 1 to 4 carbon atoms. Non-limiting examples of suitable conjugated diolefins include 1,3-butadiene, isoprene, 2-methyl-1,3-pentadiene, 4-butyl-1,3-pentadiene, 2,3-dimethyl-1,3-pentadiene 1,3-hexadiene, 1,3-octadiene, 2,3-dibutyl-1,3-pentadiene, 2-ethyl-1,3-pentadiene, 2-ethyl-1,3-butadiene and the like. Conjugated diolefin monomers containing from 4 to 8 carbon atoms are preferred, 1,3-butadiene and isoprene are more preferred.

The polymer based on a conjugated diene monomer can be a homopolymer, or a copolymer of two or more conjugated diene monomers, or a copolymer with a vinyl aromatic monomer.

The vinyl aromatic monomers which can optionally be used are selected so as to be copolymerizable with the conjugated diolefin monomers being employed. Generally, any vinyl aromatic monomer which is known to polymerize with organo-alkali metal initiators can be used.

Suitable vinyl aromatic monomers usually contain in the range of from 8 to 20 carbon atoms, preferably from 8 to 14 carbon atoms. Examples of vinyl aromatic monomers which can be copolymerized include styrene, alpha-methyl styrene, and various alkyl styrenes including p-methylstyrene, p-methoxy styrene, 1-vinylnaphthalene, 2-vinyl naphthalene, 4-vinyl toluene and the like. Styrene is preferred for copolymerization with 1,3-butadiene alone or for terpolymerization with both 1,3-butadiene and isoprene.

The halogenated butyl elastomer may be used alone or in combination with other elastomers such as:
BR—polybutadiene
ABR—butadiene/$C_1$-$C_4$ alkyl acrylate copolymers
CR—polychloroprene
IR—polyisoprene
SBR—styrene/butadiene copolymers with styrene contents of 1 to 60, preferably 20 to 50 wt. %
IIR—isobutylene/isoprene copolymers
NBR—butadiene/acrylonitrile copolymers with acrylonitrile contents of 5 to 60, preferably 10 to 40 wt. %
HNBR—partially hydrogenated or completely hydrogenated NBR
EPDM—ethylene/propylene/diene copolymers The filler is composed of particles of a mineral, and examples include silica, silicates, clay (such as bentonite), gypsum, alumina, titanium dioxide, talc and the like, as well as mixtures thereof.

Further examples include:
highly dispersible silicas, prepared e.g. by the precipitation of silicate solutions or the flame hydrolysis of silicon halides, with specific surface areas of 5 to 1000, preferably 20 to 400 m$^2$/g (BET specific surface area), and with primary particle sizes of 10 to 400 nm; the silicas can optionally also be present as mixed oxides with other metal oxides such as those of Al, Mg, Ca, Ba, Zn, Zr and Ti;
synthetic silicates, such as aluminum silicate and alkaline earth metal silicates;
magnesium silicate or calcium silicate, with BET specific surface areas of 20 to 400 m$^2$/g and primary particle diameters of 10 to 400 nm;
natural silicates, such as kaolin and other naturally occurring silica;
glass fibers and glass fiber products (matting, extrudates) or glass microspheres;
unmodified and organophilically modified clays, including natural occurring and synthetic clays, such as montmorillonite clay;
metal oxides, such as zinc oxide, calcium oxide, magnesium oxide and aluminum oxide;
metal carbonates, such as magnesium carbonate, calcium carbonate and zinc carbonate;
metal hydroxides, e.g. aluminum hydroxide and magnesium hydroxide;

or combinations thereof.

Some mineral particles have hydroxyl groups on their surface, rendering them hydrophilic and oleophobic. This exacerbates the difficulty of achieving good interaction between the filler particles and the butyl elastomer. For many purposes, the preferred mineral is silica, preferably silica prepared by the carbon dioxide precipitation of sodium silicate.

Dried amorphous silica particles suitable for use in accordance with the present invention have a mean agglomerate particle size in the range of from 1 to 100 microns, preferably between 10 and 50 microns and more preferably between 10 and 25 microns. It is preferred that less than 10 percent by volume of the agglomerate particles are below 5 microns or over 50 microns in size. A suitable amorphous dried silica moreover has a BET surface area, measured in accordance with DIN (Deutsche Industrie Norm) 66131, of between 50 and 450 square meters per gram and a DBP absorption, as measured in accordance with DIN 53601, of between 150 and 400 grams per 100 grams of silica, and a drying loss, as measured according to DIN ISO 787/11, of from 0 to 10 percent by weight. Suitable silica fillers are available under the trademarks HiSil® 210, HiSil® 233 and HiSil® 243 from PPG Industries Inc. Also suitable are Vulkasil S and Vulkasil N, from Bayer AG (Vulkasil is a registered trademark of Bayer AG).

Also, according to the present invention, the mineral filler is preferably clay. More preferably organophilically modified clays.

Those mineral filler may be used in combination with known non-mineral fillers, such as carbon blacks; the carbon blacks to be used here are prepared by the lamp black, furnace black or gas black process and have BET specific surface areas of 20 to 200 $m^2/g$, e.g. SAF, ISAF, HAF, FEF or GPF carbon blacks; or rubber gels, preferably those based on polybutadiene, butadiene/styrene copolymers, butadiene/acrylonitrile copolymers and polychloroprene.

Non-mineral fillers are not normally used as filler in the halobutyl elastomer compositions of the present invention, however, non-mineral fillers may be present in an amount up to 40 phr. In these cases, it is preferred that the mineral filler should constitute at least 55% by weight of the total amount of filler. If the halobutyl elastomer composition of the present invention is blended with another elastomeric composition, that other composition may contain mineral and/or non-mineral fillers.

Suitable phosphine based modifiers for use in the present invention include the presence of a neutral three-coordinate phosphorus center which possesses a lone pair of electrons (centered on the neutral three-coordinate phosphorus) whose electronic and steric environment are such that the phosphorus center is nucleophilic. In addition, suitable phosphorus based modifier may optionally possess one or several free hydroxyl functionalities and/or one or several silyl ether functionalities. An example of a suitable phosphine based compound is triphenylphosphine, $PPh_3$.

The amount of phosphine based modifier contained in the reinforced elastomeric compound is typically in the range from 0.1 to 20 parts per hundred parts elastomer, preferably from 2 to 10, more preferably from 3 to 5 parts per hundred parts elastomer.

The rubber compound according to the present invention may also contain a silazane compound having one or more silazane groups, such as a disilazane. Organic silazane compounds are preferred. Suitable silazane compounds include but are not limited to hexamethyidisilazane, heptamethyidisilazane, 1,1,3,3-tetramethyldisilazane, 1,3-bis (chloromethyl)tetramethyldisilazane, 1,3-divinyl-1,1,3,3-tetramethyldisilazane, and 1,3-diphenyltetramethyldisilazane.

The amount of filler to be incorporated into the halobutyl elastomer can vary between wide limits. Typical amounts of the filler range from 20 parts to 250 parts, preferably from 30 parts to 100 parts, more preferably from 40 to 80 parts per hundred parts of elastomer.

Furthermore up to 40 parts of processing oil, preferably from 5 to 20 parts, per hundred parts of elastomer, may be present in the elastomeric compound. Further, a lubricant, for example a fatty acid such as stearic acid, may be present in an amount up to 3 parts, more preferably in an amount up to 2 parts per hundred parts of elastomer.

The halobutyl elastomer that is admixed with the mineral filler and the phosphine based modifier may be in a mixture with another elastomer or elastomeric compound. The halobutyl elastomer should constitute more than 5% of any such mixture. Preferably the halobutyl elastomer should constitute at least 10% of any such mixture. More preferably the halobutyl elastomer constitutes at least 50% of any such mixture. In most cases it is preferred not to use mixtures but to use the halobutyl elastomer as the sole elastomer. If mixtures are to be used, however, then the other elastomer may be, for example, natural rubber, polybutadiene, styrene-butadiene or poly-chloroprene or an elastomer compound containing one or more of these elastomers.

The filled halobutyl elastomer can be cured to obtain a product which has improved properties, for instance in abrasion resistance and tensile strength. Curing can be effected with sulfur. The preferred amount of sulfur is in the range of from 0.3 to 2.0 parts per hundred parts of rubber. An activator, for example zinc oxide, may also be used, in an amount in the range of from 0.5 parts to 2 parts per hundred parts of rubber. Other ingredients, for instance stearic acid, antioxidants, or accelerators may also be added to the elastomer prior to curing. Sulphur curing is then effected in the known manner. See, for instance, chapter 2, "The Compounding and Vulcanization of Rubber", of "Rubber Technology", $3^{rd}$ edition, published by Chapman & Hall, 1995, the disclosure of which is incorporated by reference with regard to jurisdictions allowing for this procedure.

Other curatives known to cure halobutyl elastomers may also be used. A number of compounds are known to cure halobutyl elastomers, for example, bis dieneophiles (for example m-phenyl-bis-maleamide, HVA2), phenolic resins, amines, amino-acids, peroxides, zinc oxide and the like. Combinations of the aforementioned curatives may also be used. The mineral-filled halobutyl elastomer of the present invention may be admixed with other elastomers or elastomeric compounds before it is subjected to curing with sulphur.

The halobutyl elastomer(s), filler(s), phosphine based modifier(s) and optionally other filler(s) are mixed together, suitably at a temperature in the range of from 20 to 200° C. A temperature in the range of from 50 to 150° C. is preferred. Normally the mixing time does not exceed one hour; a time in the range from 2 to 30 minutes is usually adequate. The mixing is suitably carried out on a two-roll mill mixer, which provides good dispersion of the filler within the elastomer. Mixing may also be carried out in a Banbury mixer, or in a Haake or Brabender miniature internal mixer. An extruder also provides good mixing, and has the further advantage that it permits shorter mixing times. It is also possible to carry out the mixing in two or more stages. Further, the mixing can be carried out in different apparatuses, for example one stage may be carried out in an internal mixer and another in an extruder.

According to the present invention the halobutyl elastomer(s), fillers(s) and phosphine modifiers may be added incrementally to the mixing devise. Preferably, the halobutyl elastomer(s) and phosphine modifier(s) are premixed and then the filler is added.

More preferably, the mixing sequence employed in the preparation of compounds according to the present invention includes a heat treating stage in which the halobutyl elastomer and the phosphine based modifier containing compound are blended at 100° C. for a period of 5 to 60 minutes.

The enhanced interaction between the filler and the halobutyl elastomer results in improved properties for the filled elastomer. These improved properties include higher tensile strength, higher abrasion resistance, lower permeability and better dynamic properties. These render the filled elastomers suitable for a number of applications, including, but not limited to, use in tire treads and tire sidewalls, tire innerliners, tank linings, hoses, rollers, conveyor belts, curing bladders, gas masks, pharmaceutical enclosures and gaskets.

The filled halobutyl rubber compositions of the present invention, such as filled bromobutyl rubber compositions, find many uses, but mention is made particularly of use in tire tread compositions.

The invention is further illustrated in the following examples.

EXAMPLES

Description of Tests:

Hardness and Stress Strain Properties were determined with the use of an A-2 type durometer following ASTM D-2240 requirements. The stress strain data was generated at 23° C. according to the requirements of ASTM D-412 Method A. Die C dumbbells cut from 2 mm thick tensile sheets (cured for tc90+5 minutes at 160° C.) were used. DIN abrasion resistance was determined according to test method DIN 53516. Sample buttons for DIN abrasion analysis were cured at 160° C. for tc90+10 minutes. The tc90 times were determined according to ASTM D-5289 with the use of a Moving Die Rheometer (MDR 2000E) using a frequency of oscillation of 1.7 Hz and a 1° arc at 170° C. for 30 or 60 minutes total run time. Curing was achieved with the use of an Electric Press equipped with an Allan-Bradley Programmable Controller. The tensile properties and abrasion index of this compound is summarized in Table 2.

Description of Ingredients:
Silica—HiSil® 233—a PPG product Ion-exchanged montmorillonite clay containing 40 wt. % of dimethyldialkylammonium (70% $C_{18}$, 26% $C_{16}$ and 4% $C_{14}$) functionality—Nanomer 1.44 PA—a product of Nanocor Inc.
Triphenylphosphine—available from Sigma-Aldrich (Oakville, Ontario) BIIR—Bayer® Bromobutyl™ 2030—a product of Bayer Inc.
Stearic Acid—Emersol 132 NF—available from Acme Hardesty Co.
Sulfur (NBS)—available from NIST
Zinc Oxide—available from St. Lawrence Chemical Co.

Example 1—Comparative

Example 1 was prepared in a three stage mix using a 6"×12" two-roll mill (see formulation in Table 1). In the first stage, the roll temperature was set to 30° C. at which point the rubber was introduced onto the mill and allowed to band (rolls adjusted to a tight nip setting). Once a rolling bank was obtained, the remaining compound ingredients (less the curatives) were added incrementally. On complete incorporation of the filler and modifier, the roll temperature was increased to 100° C. and the rubber was banded for a total of 10 minutes. The compound was then removed from the mill and allowed to cool to room temperature. At this point, the rubber was re-introduced onto the mill (roll temperature=30° C.) and blended with the curative package.

The tensile properties and abrasion index of this compound is summarized in Table 2.

Example 2—Comparative

Example 2 was mixed with the use of a Haake Polylab R600 internal mixer. The ingredients (see Table 1) were added into the mixer and blended for a total of 7 minutes at 30° C. and 60 rpm. The final mixture was then calendered and compression molded into a 2.5 mm thick sheet and cured at 160° C. for 90 minutes. The tensile properties of this compound were determined with the use of an INSTRON universal testing machine, series 3360, operating at a crosshead speed of 500 mm/min at 23° C. Test specimens of approximately 2.5 mm in thickness were cut from the compression-molded sheets. The resulting tensile plot (with modulus value) is depicted in the FIGURE.

Example 3

Example was prepared in a three stage mix using a 6"×12" two-roll mill (see recipe in Table 1). In the first stage, the roll temperature was set to 30° C. at which point the rubber was introduced onto the mill and allowed to band (rolls adjusted to a tight nip setting). Once a rolling bank was obtained, the remainder of the compounding ingredients (minus the curatives) were added incrementally. On complete incorporation of the filler and modifier, the roll temperature was increased to 100° C. and the rubber was banded for a total of 10 minutes. The compound was then removed from the mill and allowed to cool to room temperature. At this point, the rubber was re-introduced onto the mill (roll temperature=30° C.) and blended with the curative package.

The tensile properties and abrasion index of this compound is summarized in Table 2.

Example 4

Example 4 was mixed with the use of a Haake Polylab R600 internal mixer. The BIIR was treated with $PPh_3$ (in the internal mixer) at 100° C. and 60 rpm for a period of 1 hour. At this point, the clay was added and mixing continued for an additional 20 minutes. The final mixtures were calendered and compression molded at 100° C. for 40 minutes into 2.5 mm thick sheets. The tensile properties of this compound were determined with the use of an INSTRON universal testing machine, series 3360, operating at a crosshead speed of 500 mm/min at 23° C. Test specimens of approximately 2.5 mm in thickness were cut from the compression-molded sheets. The resulting tensile plot and (with modulus value) is depicted in the FIGURE.

The preceding examples clearly demonstrate the positive effect of $PPh_3$ on BIIR-Silica formulations. The significant reduction in the compound hardness measured for Example 3 (c.f. that recorded for Example 1) implies an improved level of filler dispersion. Consequently, Example 3 possesses an increased ultimate tensile as well as a significant reduction in abrasion volume loss as compared to the $PPh_3$-free analogue, Example 1. These observations suggest that $PPh_3$ can effectively mediate the surface energy differences which exist between neat-BIIR and silica and thereby significantly improve the degree of interaction between the polar filler and the elastomeric continuous phase.

The pretreatment of BIIR with $PPh_3$ (Example 4) results in the formation of an IIR-$PPh_3$ ionomer which can better interact with polar fillers. As can be seen in the FIGURE, the reinforcement level of Example 4 ($PPh_3$ modified butyl+15 wt. % of Nanomer 1.44 PA) exceeds that observed for the cured (ZnO/stearic acid) $PPh_3$-free control compound (Example 2).

TABLE 1

Formulation

| Ingredient (phr) | Example 1 | Example 2 | Example 3 | Example 4 |
|---|---|---|---|---|
| BIIR-BB2030 | 100 | 100 | 100 | 100 |
| HiSil 233 | 60 | — | 60 | — |
| Nanomer I.44PA | — | 15 | — | 15 |
| MgO | 1 | — | 1 | — |
| PPh$_3$ | — | — | 4.7 | 7.9 |
| Steric Acid | 1 | 1 | 1 | — |
| Sulfur | 0.5 | — | 0.9 | — |
| Zinc Oxide | 1.5 | 5 | 1.5 | — |

TABLE 2

Results

| Example | DIN Abrasion Volume Loss (mm$^2$) | Hardess (Pts.) | Ultimate Tensile (MPa) | Ultimate Elongation (%) |
|---|---|---|---|---|
| 1 | >450 | 66 | 7.1 | 763 |
| 3 | 234 | 53 | 15.5 | 583 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for preparing a filled halobutyl elastomer comprising admixing at least one halogenated isoolefin-conjugated diolefin-copolymer with at least one mineral filler, and at least one phosphine modifier
   wherein the at least one halogenated isoolefin-conjugated diolefin-copolymer and the at least one phosphine modifier form an ionomer which interacts with polar surfaces of the at least one mineral filler.

2. The process according to claim 1, wherein the halogenated isoolefin-conjugated diolefin-copolymer is a brominated butyl elastomer or a chlorinated butyl elastomer.

3. The process according to claim 1, wherein the phosphine modifier has a neutral three-coordinate phosphorus center which possesses a lone pair of electrons centered on the neutral three-coordinate phosphorus rand having electronic and steric environment so that the phosphorus center is nucleophilic.

4. The process according to claim 3, wherein the phosphine modifier is functionalized with one or more group selected from group consisting of a-hydroxy groups silyl ether groups and combinations thereof.

5. The process according to claim 3, wherein the phosphine modifier is triphenyiphosphine.

6. The process according to claim 1, wherein the mineral tiller is selected from the group consisting of regular or highly dispersible silica, silicates, clay, gypsum, alumina, titanium dioxide, talc and mixtures thereof.

7. The process according to claim 6, wherein the mineral filler is silica or clay.

8. The process according to claim 2, wherein the halogenated butyl elastomer is a brominated butyl elastomer.

9. The process according to claim 1, wherein the amount of the phosphine modifier admixed is in the range of from 0.1 to 20 parts per hundred parts of elastomer.

10. The process according to claim 1, further comprising curing the elastomer.

11. The process according to claim 1, wherein the at least one halobutyl elastomer and at least one phosphine modifier are admixed prior to admixing at least one mineral filler.

12. A method of improving the tensile strength of a filled, cured elastomer composition comprising at least one halogenated isoolefin-conjugated diolefin-copolymer comprising admixing the halogenated isoolefin-conjugated diolefin-copolymer with at least one mineral filler and at least one phosphine modifier and curing the elastomer composition.

13. The process according to claim 1, wherein the halogenated isoolefin-conjugated diolefin-copolymer is brominated isobutene-isoprene-copolymers.

14. A method for preparing a filled halobutyl elastomer comprising:
   pretreating a halogenated isoolefin-conjugated diolefin-copolymer with at least on phosphine modifier to form a halogenated isoolefin-conjugated diolefin-copolymer-phosphine modifier ionomer; and
   admixing at least one mineral filler with the ionomer.

15. A method for preparing a filled halobutyl elastomer comprising:
   pretreating a halogenated isoolefin-conjugated diolefin-copolymer with at least on phosphine modifier to form a halogenated isoolefin-conjugated diolefin-copolymer-phosphine modifier ionomer; and
   admixing at least one mineral filler with the ionomer; and
   curing the admixture.

* * * * *

UNITED STATES PATENT AND TRADEMARK OFFICE
CERTIFICATE OF CORRECTION

PATENT NO. : 7,238,736 B2 Page 1 of 1
APPLICATION NO. : 10/834437
DATED : July 3, 2007
INVENTOR(S) : John Scott Parent et al.

It is certified that error appears in the above-identified patent and that said Letters Patent is hereby corrected as shown below:

Column 9, Claim 3:
line 48 "rand" should be --and--;

Column 10, Claim 4:
line 3 "a-hydroxy" should be --hydroxy--;

Column 10, Claim 5:
line 6 "triphenyiphosphine" should be --triphenylphosphine--;

Column 10, Claim 6:
line 8 "tiller" should be --filler--

Column 10, Claim 14:
line 37 "at least on phosphine" should be --at least one phosphine--

Signed and Sealed this

Twenty-sixth Day of February, 2008

JON W. DUDAS
*Director of the United States Patent and Trademark Office*